United States Patent
Laevens et al.

(10) Patent No.: US 8,677,220 B2
(45) Date of Patent: Mar. 18, 2014

(54) ERROR CONTROL ON-DEMAND

(75) Inventors: Koenraad Laevens, Gent (BE); Danny De Vleeschauwer, Evergem (BE); Natalie Degrande, Overmere (BE)

(73) Assignee: Alcatel Lucent, Paris (FR)

(*) Notice: Subject to any disclaimer, the term of this patent is extended or adjusted under 35 U.S.C. 154(b) by 185 days.

(21) Appl. No.: 13/129,015

(22) PCT Filed: Nov. 24, 2009

(86) PCT No.: PCT/EP2009/008429
§ 371 (c)(1),
(2), (4) Date: Jun. 16, 2011

(87) PCT Pub. No.: WO2010/063408
PCT Pub. Date: Jun. 10, 2010

(65) Prior Publication Data
US 2011/0258519 A1  Oct. 20, 2011

(30) Foreign Application Priority Data

Dec. 3, 2008  (EP) ..................... 08291139

(51) Int. Cl.
*H03M 13/00* (2006.01)
*H04L 1/00* (2006.01)

(52) U.S. Cl.
USPC ........................... 714/776; 370/216

(58) Field of Classification Search
USPC .......................... 714/776; 370/216
See application file for complete search history.

(56) References Cited

U.S. PATENT DOCUMENTS

2004/0243905 A1* 12/2004 Merritt .......................... 714/758
2007/0089039 A1*  4/2007 Nagasaka ...................... 714/776
2010/0077251 A1*  3/2010 Liu et al. ........................... 714/4

OTHER PUBLICATIONS

Hai Jiang; Weihua Zhuang; Xuemin Shen, "Cross-layer design for resource allocation in 3G wireless networks and beyond," Communications Magazine, IEEE, vol. 43, No. 12, pp. 120,126, Dec. 2005.*

(Continued)

*Primary Examiner* — Cynthia Britt
(74) *Attorney, Agent, or Firm* — Harness, Dickey & Pierce

(57) ABSTRACT

The present invention relates to a new error control paradigm in a packet switched network that is particularly advantageous for multicast transmission.

Figure 1:
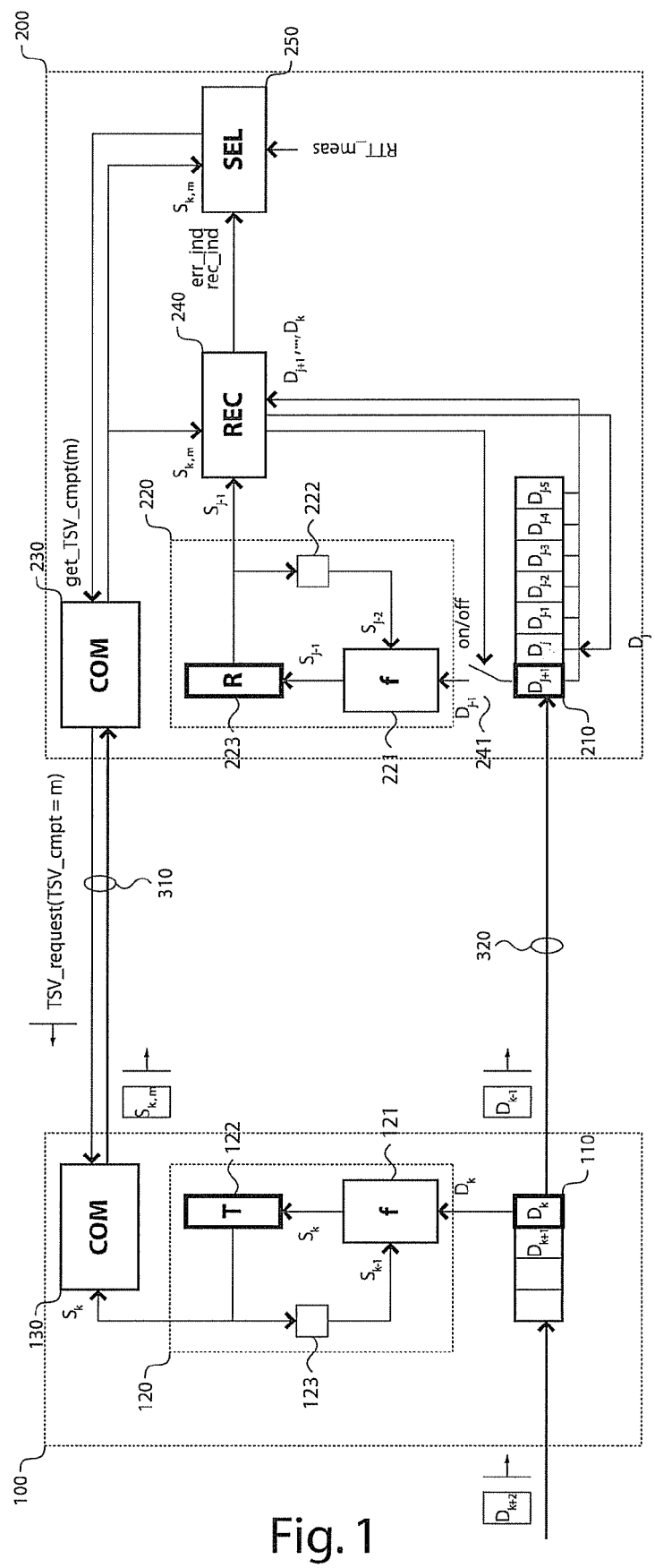

A transmission Status Vector TSV (T) is updated at the sender side whenever a new outgoing data packet (Dj−1) is scheduled for transmission. A corresponding Reception status Vector RSV (R) is similarly updated at the receive side whenever a new incoming and correctly indexed data packet (Dj−1) is validly received.

As soon as a missing or corrupted data packet (Dj) is detected, the update of the RSV is suspended. A request is then sent to the sender to get the current Tsv's value, or a part thereof. The erroneous data packet is then recovered from the current TSV's value (Sk,m), from the lastly updated RSV's value (Sj−1), and from otherwise validly received data packets (Dj+1, . . . , Dk).

The present invention more specifically relates to a transmitting unit (100) and a receiving unit (200) implementing that paradigm, and correspondingly to a method for protecting a flow of indexed data packets against data lost or data corruption, and a method for recovering a missing or corrupted data packet within a flow of indexed data packets.

18 Claims, 2 Drawing Sheets

(56) References Cited

OTHER PUBLICATIONS

Dihong Tian; Xiaohuan Li; Al-Regib, Ghassan; Altunbasak, Y.; Jackson, J.R., "Optimal packet scheduling for wireless video streaming with error-prone feedback," Wireless Communications and Networking Conference, 2004. WCNC. 2004 IEEE , vol. 2, No., pp. 1287,1292 vol. 2, Mar. 21-25, 2004.*

Frederik Vanhaverbeke et al., "Binary Erasure Codes for Packet Transmission Subject to Correlated Erasures".
"Multiplexing protocol for low bit rate multimedia communication; H.223 (Jul. 2001)".
Neckebroek J. et al. "Protection of video packets over a Wireless Rayleigh fading link: FEC versus ARQ".
Neckebroek J. et al., "The impact of Rayleigh fading on packet loss in FEC-protected real-time packet-based transmssion systems".

* cited by examiner

ERROR CONTROL ON-DEMAND

The present invention relates to a new error control paradigm in a packet switched network.

Packet switched networks are unreliable per se, meaning they offer no guarantee that they will not delay, damage, or lose packets, or deliver them out of order.

Forward Error Correction (FEC) and Retransmission are the basic error control paradigms for providing reliable communication over a packet switched network.

Retransmission is the resending of data packets which have been either corrupted or lost, and relies on:
- checksums (or alike) for checking the integrity of the received information,
- acknowledgments, that is to say explicit receipts from the receiver towards the sender through some return channel, and
- retransmission of missing or damaged packets (initiated by the sender or the receiver).

Retransmission implies that a copy of each outstanding packet (i.e., not yet acknowledged) is kept at the sender side for further retransmission, if any.

There are several forms of retransmission strategies, most noticeably:
- Selective Acknowledgment (SACK): the receiver explicitly notifies the sender which packets, messages, or segments were received correctly, and by the way which packets were not.
- Cumulative Acknowledgment: the receiver acknowledges a packet, message, or segment as being received correctly, which acknowledgment implying that all previous packets were received correctly too. Transport Control Protocol (TCP) uses cumulative acknowledgment.
- Negative Acknowledgment (NACK): the receiver explicitly notifies the sender which packets, messages, or segments were received incorrectly and thus are to be retransmitted.

Retransmission is disadvantageous for multicast transmission, that is to say if one sender serves many receivers with one common data stream. Typically, reliability for multicast transmission is achieved by means of negative acknowledgments and retransmission through a unicast and concurrent communication channel. A considerable amount of data packets needs to be held at the server side or at a multicast replication node so as to achieve an acceptable Quality of Experience (QoE) for the end-user. The size of the retransmission cache depends on the Round Trip Time (RTT) from the receiver to the retransmission unit, and on the number of re-transmission that might be necessary for the requested packet to eventually reach the receiver (i.e., on the noise and/or network environment a subscriber may undergo). Typically, the last 100-200 ms of video information (i.e., about 50 to 100 data packets) need to be cached for each and every broadcasted channels. Similarly, a considerable amount of dedicated unicast communication resources needs to be provisioned for packet retransmission so as to serve many subscribers, clearly, such a solution is not scalable as the number of subscribers and channels grow.

FEC is the addition of redundant data to the information data. This allows the receiver to detect and correct errors by itself (within some bound), yet at the expense of some data overhead. FEC is therefore applied in situations where retransmissions are relatively costly or impossible.

The two main categories of FEC are block coding, such as Reed Solomon (RS), Golay, Bose and Ray-Chaudhuri (BCH) and Hamming codes, and convolutional coding. The most recent development in error correction is turbo coding, a scheme that combines two or more relatively simple convolutional codes and an interleaver to produce a block code that can perform to within a fraction of a decibel of the Shannon limit.

FEC is disadvantageous too in that a considerable amount of data overhead is required to achieve an acceptable QoE, thereby preventing the corresponding channel bandwidth to be used by other services.

The objectives of the present invention are achieved and the aforementioned shortcomings of the prior art are overcome by a transmitting unit for transmitting a flow of indexed data packets towards a receiving unit, and comprising:
- a transmission status computing means adapted to update a Transmission Status Vector TSV whenever a new outgoing data packet is scheduled for transmission, which TSV matching a corresponding Reception status vector RSV similarly updated at said receiving unit whenever a new incoming data packet, the index of which is the next expected data packet index, is validly received,
- a communication means adapted, upon request from said receiving unit, to transmit at least one current component value for respective ones of at least one vector component of said TSV, which when combined with a lastly updated vector value of said RSV, and with otherwise validly received data packets, allows recovering of at least one missing or corrupted data packet, and correspondingly by a receiving unit for receiving a flow of indexed data packets from a transmitting unit, and comprising:
- a reception status computing means adapted to update a Reception Status Vector RSV whenever a new incoming data packet, the index of which is the next expected data packet index, is validly received, which RSV matching a corresponding Transmission status vector TSV similarly updated at said transmitting unit whenever a new outgoing data packet is scheduled for transmission,
- a communication means adapted to get from said transmitting unit at least one current component value for respective ones of at least one vector component of said TSV,
- a recovering means adapted to recover a missing or corrupted data packet from said at least one current component value, from a lastly updated vector value of said RSV, and from otherwise validly received data packets.

A Transmission Status Vector (TSV) and a Reception Status vector (RSV) are maintained up-to-date at the transmit and receive side respectively. The TSV and RSV are updated according to a common algorithm whenever a new outgoing data packet is scheduled for transmission and whenever a new incoming and contiguously indexed data packet (i.e., the index of which is the next expected data packet index) is validly received. Somehow, the TSV and RSV keep track of the transmission and reception history (i.e., which information bytes have been sent and received), yet in a compacted form. Typically, the TSV and RSV comprise one or more vector components (i.e., rows or columns depending on the vector orientation), and the length of each vector component matches the data packet length. The TSV and RSV are reset to some initial state at a commonly agreed index of transmission and reception, which index matching a corresponding data packet index encoded in the data packet itself. Those indexes do not necessarily coincide, a matching correspondence between them being however required.

As soon as a missing or corrupted data packet within a flow of received data packets is detected, the receiver gets out of sync with the transmitter and can no longer update the RSV. A request is then sent to the transmitter to get the current TSV's value, that is to say the last updated TSV's value, or a part thereof, as well as the transmission index to which that value corresponds. By combining those transmission status information with the last updated RSV's value and the otherwise correctly received data packets, one derives a set of equations with the data symbols (e.g., bits, bytes) that compose the missing or corrupted data packet as the unknown parameters. If the computation of the transmission and reception status vector is such that those equations are invertible, then the missing or corrupted data symbols can be recovered and the update of the RSV can be resumed, as it will be set forth further in the description.

The present invention is advantageous in that error control information are only transmitted on demand, and up to the exact extent needed for recovering the data that have been lost or corrupted. The present invention is further advantageous in that the whole transmission history is somehow compiled into a single state vector that has fewer components than a corresponding transmission cache where data packets are held for retransmission, thereby relaxing the memory requirement up to an order of magnitude. Last but not least, the receiver can dimension its reception cache and its recovering strategy so as to achieve the required QoE for that user. The transmitter does not need to keep track of hundred of packets for accommodating the worst-case scenario. Only the dimension of the state vector does matter: the more vector components, the more data packets that can be recovered and the more resilient the data communication system.

It is to be noticed that the RSV can be a subset of the actual TSV, on account of e.g. less computational complexity or lower recovering capability at the receive side, in which case the TSV is to be construed as the Tsv's subset that matches the RSV of that specific receiver.

It is to be further noticed that the computation of transmission and reception status information can be carried out at any layer in a communication protocol suite. At Layer 2 (L2) for instance, the transmission and reception status information would be computed from e.g. the Ethernet payload (and provided the Ethernet frames are indexed in one way or the other), and there would be as many state vectors as there are uni-directional unicast or multicast communications. Alternatively, the computation of transmission and reception status information can be restricted to a certain type of traffic or payload.

An example of a transmitting unit according to the invention is an encoding device, such as a video head end, or a multimedia server, or an intermediate replication node, such as a Digital Subscriber Line Access Multiplexer (DSLAM) or a wireless/mobile base station,
and an example of a receiving unit according to the invention is a subscriber gateway, such as a Set Top Box (STB) or a modem or a router, or a subscriber terminal such as a television set or a personal computer or a wireless/mobile terminal, or a decoding device.

A further embodiment of a transmitting unit according to the invention is characterized in that said communication means is further adapted to periodically advertise towards said receiving unit a current vector value of said TSV.

By regularly advertising (or broadcasting) the current Tsv's value, the transmitting unit lets the receiving unit re-synchronize its RSV from time to time, thereby avoiding computational mismatches on account of undetected data corruption. It is also helpful in case of too many erroneous packets, in which case the receiver needs to resync its state vector with the transmitter so as to resume normal operation.

An alternative embodiment of a transmitting unit according to the invention is characterized in that said communication means is further adapted to select said at least one vector component under control of said receiving unit, and correspondingly an alternative embodiment, of a receiving unit according to the invention is characterized in that said receiving unit further comprises a selector adapted to select said at least one vector component within said TSV.

The receiver closely controls the amount of transmission status information that is required by the recovery process, that is to say less Tsv's components would be requested if a single data packet was lost here and there, than if a burst of consecutive data packets were lost on account of e.g. impulse noise. The amount of error control information matches the specific channel impairment a subscriber is undergoing, thereby relaxing the bandwidth usage with respect to FEC paradigm (where error control information are appended by default to each and every transmitted payload), and making that bandwidth available for other concurrent services.

In a first embodiment, said at least one vector component are selected in dependence of a current amount of information, the recovery of which is pending.

In a second embodiment, said at least one vector component are selected in dependence of an estimated amount of information, the recovery of which is expected to be pending upon receipt of said at least one current component value.

By anticipating the still-to-come erroneous packets, one avoids a new communication round if the firstly-requested TSV's components no longer suffice for an ever-increasing number of erroneous packets, and if additional Tsv's components are to be further requested. The expected amount of missing or corrupted information is typically based on the observed error pattern and on RTT measurements. This embodiment achieves faster data recovery, yet at the expense of some additional overhead in case the expectation is too pessimistic.

Still another embodiment of a transmitting unit and a receiving unit according to the invention are characterized in that said communication means are adapted to communicate with each other by means of a stateless data communication protocol.

The transmission status information that are requested and transmitted are the current ones, and thus are identical irrespective of the requesting client. If a first transmission of the current state vector fails, a second transmission of a subsequent state vector will take place. A stateless communication protocol, such as User Datagram Protocol (UDP), is then particularly suited. Consequently, no communication context need to be kept at the transmit side, making this solution highly scalable. This embodiment is particularly advantageous for multicast transmission.

The present invention also relates to a method for protecting a flow of indexed data packets transmitted towards a receiving unit against data lost or data corruption, and that comprises the steps of:
 updating a Transmission status vector TSV whenever a new outgoing data packet is scheduled for transmission, which TSV matching a corresponding Reception status Vector RSV similarly updated at said receiving unit whenever a new incoming data packet, the index of which is the next expected data packet index, is validly received,
 upon request from said receiving unit, transmitting at least one current component value for respective ones of at least one vector component of said TSV, which when combined with a lastly updated vector value of said RSV, and with otherwise validly received data packets, allows recovering of at least one missing or corrupted data packet.

and correspondingly to a method for recovering a missing or corrupted data packet within a flow of indexed data packets received from a transmitting unit, and that comprises the steps of:

updating a Reception status vector RSV whenever a new incoming data packet, the index of which is the next expected data packet index, is validly received, which RSV matching a corresponding Transmission status vector TSV similarly updated at said transmitting unit whenever a new outgoing data packet is scheduled for transmission, getting from said transmitting unit at least one current component value for respective ones of at least one vector component of said TSV, recovering said missing or corrupted data packet from said at least one current component value, from a lastly updated vector value of said RSV, and from otherwise validly received data packets.

The embodiments of a transmitting unit according to the invention correspond with the embodiments of a method according to the invention for protecting a flow of indexed data packets transmitted towards a receiving unit against data lost or data corruption, and the embodiments of a receiving unit according to the invention correspond with the embodiments of a method according to the invention for recovering a missing or corrupted data packet within a flow of indexed data packets received from a transmitting unit.

Figure 2:
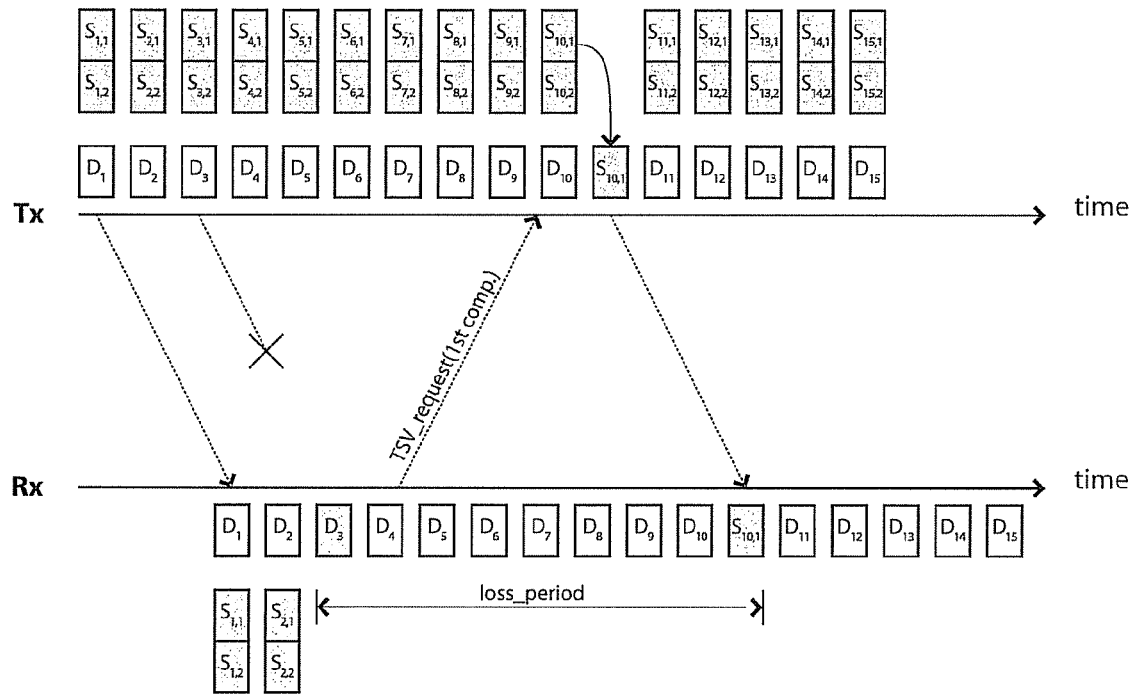

The above and other objects and features of the invention will become more apparent and the invention itself will be best understood by referring to the following description of an embodiment taken in conjunction with the accompanying drawings wherein:

FIG. 1 represents a transmitting unit and a receiving unit according to the invention, FIG. 2 represent an example of information flowing between the transmitting unit and the receiving unit.

There is seen in FIG. 1 a communication system 1 comprising:

a transmitting unit 100, and
a receiving unit 200.

The transmitting unit 100 and the receiving unit 200 are coupled to each other via a packet switched communication network that may comprise further intermediate network nodes (not shown), and that supports a data path 310, through which data packets are conveyed from the transmitting unit 100 towards the receiving unit 200, and an error control path 320, through which error control messages are exchanged between the transmitting unit 100 and the receiving unit 200.

The transmitting unit 100 and the receiving unit 200 respectively transmits and receives a flow of indexed data packets Dj−5, Dj−4, Dj−3, Dj−2, Dj−1, Dj, . . . , Dk−1, Dk, Dk+1, Dk+2, . . . , wherein j denotes the index of a particular data packet that has been lost, and k denotes the index of the data packet that is being scheduled for transmission by the transmitting unit 100, with j<k.

In an exemplary embodiment of the present invention, the data packets D are RTP packets bound to a multicast address, which a plurality of receivers (inc. the receiving unit 200) listen. The RTP packets are indexed with a 16-bits RTP sequence number encoded in the RTP header. The TSV and RSV values are computed from the RTP payload. The RTP payload may be of variable length, in which case it is padded with a known bit pattern. There are as many instances of TSVs as there are multicast streams that are being transmitted, and there are as many instances of RSVs as there are multicast streams that are being listened.

The transmitting unit 100 comprises the following functional blocks:

a transmission cache 110, wherein the data packets D are held before being scheduled for transmission,
a transmission status computing unit 120 for computing a TSV T, and
a communication unit 130.

The transmission cache 110 is coupled to the transmission status computing unit 120. The transmission status computing unit 120 is further coupled to the communication unit 130.

The transmission status computing unit 120 is adapted to update the value of the TSV T whenever a new outgoing data packet, presently Dk, is scheduled for transmission.

As an exemplary embodiment, the transmission status computing unit 120 comprises:

a data repository 123 wherein the last updated value of the TSV T, presently Sk, is held,
a latch 122 (or shift register or alike) for latching the previous value of the TSV T, presently Sk−1, before that value is updated, and
a function f 121 that accepts as first argument the previous value of the TSV T as latched by the latch 122, presently Sk−1, and as second argument the RTP payload of a new data packet scheduled for transmission, presently Dk, and yields as output the new value of the TSV T, presently Sk, which new value being pushed into the data repository 123 while the previous one is latched by the latch 122.

The transmission status computation algorithm will be explicited with reference to an operation of the embodiment.

The communication unit 130 is adapted to supply the receiving unit 200 with the current (i.e., last updated) value of the TSV's components as selected by the receiving unit 200, together with the data packet index to which that value corresponds.

The communication unit 130 makes use of UDP as communication protocol.

The receiving unit 200 comprises the following functional blocks:

a reception cache 210, wherein the validly received data packets D are held before being further processed,
a reception status computing unit 220 for computing a RSV R,
a communication unit 230,
a recovering unit 240,
a selector 250.

The reception cache 210 is coupled to the reception status computing unit 220. The recovering means 240 is coupled to the reception cache 210, to the reception status computing unit 220, and to the selector 250. The selector 250 is further coupled to the communication unit 230.

The reception status computing unit 220 is adapted to update the value of the RSV R whenever a new incoming data packet, the index of which is the next expected data packet index, is validly received, presently up to data packet Dj−1.

The reception status computing unit 220 comprises:

a data repository 223 wherein the last updated value of the RSV R, presently Sj−1, is held,
a latch 222 for latching the previous value of the RSV R, presently Sj−2, before that value is updated, and
a function f 221, that equates the function 121 of the transmitting unit 100, and that accepts as first argument the previous value of the RSV R as latched by the latch 222, presently Sj−2, and as second argument the RTP payload of a validly received data packet, presently Dj−1, and yields as output the new value of the RSV R, presently Sj−1, which new value being pushed into the data repository 223 while the previous one is latched by the latch 222.

The reception status computation algorithm will be explicited with reference to an operation of the embodiment.

The communication unit 230 is adapted to get the current value of purposely selected vector components of the TSV T from the transmitting unit 200, as well as the data packet index to which that value corresponds. Presently, the communication unit 230 request the current value of the m-th component of the TSV T, and as a response gets the value Sk,m wherein k denotes the RTP sequence number to which that value corresponds.

The communication unit 230 makes use of UDP as communication protocol.

The recovering unit 240 is adapted to detect a missing or corrupted data packet, presently Dj, and thereupon to suspend the update of the RSV R through a switch 241 (see off in FIG. 1). Presently, the RSV's value is frozen to Sj−1 while new data packets Dj+1, Dk come in, since none of those indexes is the next expected data packet index, presently index j.

The recovering unit 240 is further adapted to recover a missing or corrupted data packet, presently Dj, from the lastly updated value of the RSV R, presently Sj−1, from the current value of the requested TSV component(s), presently Sk,m, and from otherwise correctly received data packets, presently Dj+1, . . . , Dk. The recovered packet is pushed into the reception cache 210 for further processing, and the update of the RSV R is resumed through the switch 241 (see on in FIG. 1).

The recovering unit 240 is further adapted to notify the selector 250 whenever a missing or corrupted data packet is detected (see err_ind in FIG. 1), and further whenever that missing or corrupted data packet is recovered (see rec_ind in FIG. 1)

The recovering algorithm will be explicited with reference to an operation of the embodiment.

The selector 250 is adapted to select the right Tsv's components so as to be able to recover one or more missing or corrupted data packets. Presently, the selector 250 selects the m-th component of the TSV T, and requests the communication unit 230 to get it (see get_TSV_cmpt(m) in FIG. 1).

The selection of the Tsv's components is based on:
the already available transmission status information, if any,
the current number of missing or corrupted data packets since the last updated value of the RSV R, or alternatively an estimated number of missing or corrupted data packets that will have to be recovered from the to-be-selected Tsv's components.

The estimation of the number of missing or corrupted data packets is based on the following factors:
the error and recovering information as notified by the recovering unit 240 (see err_ind and rec_ind in FIG. 1), allowing the selector 250 to determine the last data packet index for which the RSV's value is available and expected to be in line with the corresponding TSV's value, presently index j−1,
measurements of the RTT between the receiver unit 200 and the transmitting unit 100 (see RTT_meas in FIG. 1), such as carried out by e.g. the communication unit 230, allowing the selector 250 to estimate the data packet index for which the to-be-selected TSV's components will be available, presently index k, error ratio measurements (e.g., expected ratio of erroneous packets), such as carried out by e.g. the selector 250 based on the error information from the recovering unit 240 or from a lower layer.

The estimation may also be enhanced with additional error timing information (e.g., duration, frequency, time-of-the-day and/or time-of-the-week occurrence).

An operation of the data communication system 1 now follows.

Let Dk be the k-th packet (where k denotes the packet index such as the RTP sequence number) that has to be transmitted from the transmitting unit 100 to the receiving unit 200. This packet is split up into L symbols (e.g., bits or bytes) upon which calculations (addition, multiplication, etc) can be performed. Note also that any type of symbols could be used, but in the embodiments we will use the elements of a Galois Field (GF) as symbols, as addition and multiplication are well defined in such a field. In the rest of the description we still use the term "packet" but tacitly assume that the packet is segmented into L symbols and that each of these symbols (l= 1, . . . , L) are treated in parallel in exactly the same way. In particular, the error correction information we will construct consists of a number M of correction symbols calculated in parallel. That is, to each data symbol (l=1, . . . , L) of the packet, a vector of M correction symbols is associated. With these L vectors, M correction packets can be composed: the m-th correction packet is constructed by combining the m-th correction symbol (out of the vector of M symbols) of each and every data symbol l. This makes the correction packets of the same size as the data packets. If data packets are not of the same size, the maximum packet size should be taken and shorter packets should be stuffed with dummy information.

In order to protect the transmission of packets from packet loss or packet corruption, the following scheme is proposed. The transmitting unit 100 maintains an indexed TSV, the value of which is denoted Sk=[Sk,1; Sk,2; . . . ;Sk,M]. This M-dimensional TSV is updated for each transmitted packet Dk according to the following equation:

$$S_k = f_k(D_k, S_{k-1}) \qquad (1)$$

The function fk is a vector function that takes the value of the packet Dk's payload and the state vector value associated with the previous packet Sk−1 as inputs and produces a new state vector value Sk as output. Note that the function fk itself may depend on k. That is, in general for each packet a new rule to calculate the state vector can be used. However, we will restrict the embodiments to cases in which the function fk does not depend on k, and we will denote that function as f.

The receiving unit 200 similarly updates a RSV, the value of which matches the corresponding value of the TSV computed at the transmit side. The transmitting unit 100 and receiving unit 200 both start in the same initial state S0 and use exactly the same function f. As such the state vectors at the transmit and receive side are exact copies of each other. If a packet, say packet Dj, is lost, the receiving unit 200 gets out of sync and asks the transmitting unit 100 for a well-chosen subset of the transmitter's current state vector. As it takes some time before this request arrives at the transmitting unit 100, the current vector is now Sk, where k=j+r and r is some positive number that depends on the RTT and the inter-packet time. The transmitting unit 100 sends the requested entries of Sk, together with the current sequence number k, to the receiving unit 200. When this information arrives, the receiving unit 200 is in most cases able to reconstruct the missing packet. If the missing packet is reconstructed, the receiving unit 200 can keep its state vector in sync with the state vector of the transmitting unit 100. If, for some reason, the missing packet cannot be reconstructed, the receiving unit 200 should still make sure (by requesting enough correction information, or by re-initializing the state vector to some agreed value at a particular packet index, or by relying on the periodic advertising of the state vector T from the sender to the receiver) that its state vector remains in sync with the state vector of the transmitting unit 100.

Remark that the transmission of one entry of the state vector requires exactly the same capacity as the retransmission of one packet would do, if we assume that the sequence number to which the correction information corresponds, i.e. k, can piggy-back along with the error correction information in some header field.

The reconstruction at the receiver side is based on the fact that the receiver knows how a missing data packet Dj impacts the state vector Sj+r=Sk. If there are no further packet losses between j and j+r (inclusive), then the receiver should choose that packet Dj that would yield the entry (or entries) of Sj+r it received. If the function f is well chosen, then this solution Dj is unique, as it will be set forth further in the description. If there is an additional packet loss between j and j+r (inclusive), say at j+s (s<r), the receiver asks the transmitter for other well-chosen entries of its current state vector. We thus define a loss period as follows: it starts with the loss of one data packet (which has as consequence that the receiver's state vector loses sync with the transmitter's state vector), and lasts until the receiver has again enough information to resync its state vector with the transmitter's state vector (either because all packet losses during the loss period can be reconstructed, or because the receiver receives the complete state vector from the transmitter).

This is illustrated in FIG. 2. Packets D1 to D15 are transmitted from the transmitting unit 100 (Tx) towards the receiving unit 200 (Rx). Packets D3 is lost. As a consequence, the receiving unit 200 requests the first component of the TSV (see TSV_request(1$^{st}$ comp.) in FIG. 2 upon receipt of data packet D4). The requests arrives while the transmitting unit 100 schedules the transmission of data packet D10. The transmitting unit 100 replies the request by transmitting the current value of the first component of the TSV, presently S10,1, as well as the transmission index to which that value corresponds, presently k=10. The receiving unit can then reconstruct the missing data packet D3 from the last updated value of the RSV, presently S2=[S2,1; S2,2], from the otherwise correctly received data packets D4, D5, D6, D7, D8, D9 and D10, and from the current value of the first component of the transmitter's state vector, presently S10,1. Indeed, we can write:

$$S_{10}=f(D_{10},S_9)=f(D_9,f(D_8,f(D_7,f(D_6,f(D_5,f(D_4,f(D_3,S_2))))))))$$ (2)

The loss period presently starts at data packet D3 and ends upon receipt of correction information S10,1 (see loss_period in FIG. 2), and thus includes data packets D3 to D10.

Once data packet D3 has been recovered, the update of the RSV can be resumed.

If another data packet were missing, then a new request for a further TSV's components would be issued, thereby extending the loss period accordingly.

Although in the current invention the function f only takes as argument the current packet Dk, another function that takes as argument a number of the most recent packets, i.e. Dk, Dk−1, . . . , can be envisioned too, but this would of course increase the size of the transmission cache 110.

How to reconstruct missing or corrupted packets during a loss period, and what kind of correction information is asked in which circumstances, depend on the specific embodiment.

In a first embodiment, the symbols are the elements of the GF of 2 elements or GF(2), i.e. bits {0,1}. The state vector Sk has only one entry (M=1), and thus reduces to a scalar. The function f(Dk,Sk−1) (which is chosen not to depend on k) is the binary sum (i.e., the XOR) of Dk and Sk−1:

$$S_k=D_k+S_{k-1}$$ (3)

Suppose that, at some moment in time packet, Dj−1 was correctly received, and that the receiving unit 200 is in sync with the transmitting unit 100 (i.e., both have the same the state Sj−1). If packet Dj is lost, the receiving unit 200 requests correction information under the form of the transmitter's current state. Upon arrival of this request, the transmitting unit 100 returns the value of the state Sj+r and the associated sequence number j+r. When this information arrives, the receiving unit 200 has to solve the equation:

$$S_{j+r}=D_{j+r}+S_{j+r-1}=D_{j+r}+D_{j+r-1}+\ldots+D_j+S_{j-1}=C+D_j+S_{j-1}$$ (4)

C can be calculated provided the packets Dj+1 until Dj+r are correctly received, in which case Dj follows directly:

$$D_j=C+S_{j+r}+S_{j-1}$$ (5)

Packet Dj cannot be reconstructed if there is any further loss in the set of packets {Dj+1, . . . , Dj+r}. Hence, this system can correct one packet loss in one loss period, but fails to correct two or more packet losses.

Notice that, after the reception of the state Sj+r, the receiver state is again in sync with the transmitter state (such that the loss period ends after r packets).

If the correction information transmitted by the transmitting unit 100 upon request of the receiving unit 200 is lost (or equivalently, if the request itself is lost), which is detectable because e.g. a timer expires, the receiving unit 200 should persistently ask for a new update (which makes r variable but, other than making loss period durations stochastic, this has no further consequence), such that it can at least remain in sync with the transmitting unit 100. Alternatively, the receiving unit 200 may wait for the transmitting unit 100 to advertise the current value of the state vector.

In the second embodiment, the symbols are the elements of GF($p^q$), with p a prime number (in most cases p=2) and q≥1. There are Q=$p^q$ elements in this GF. Such a field contains a unique neutral element for the addition, denoted as 0, and a unique neutral element for the multiplication, denoted as 1. The state information is a M-dimensional array of elements of this GF and the vector function f(Dk,Sk−1) (which is chosen not to depend on k) is defined as:

$$S_k=a\cdot D_k+A\cdot S_{k-1}$$ (6)

where A is an (M×M) matrix and a is a (M×1)-matrix (i.e., a vector) in GF($p^q$). The addition and multiplication used in this definition are the ones from the GF($p^q$).

Suppose that, at some moment in time, packet Dj−1 is correctly received, and that the receiving unit 200 is in sync with the transmitting unit 100 (i.e., both have the same the state Sj−1). If packet Dj is lost, the receiving unit 200 requests correction information under the form of the first component of the transmitter's state vector. Upon arrival of this request, the transmitting unit 100 returns the value of the state Sj+r,1 and the associated sequence number j+r. At the moment this correction information arrives, the receiving unit 200 can try to reconstruct the lost packet. If there is no further loss in the set of packets {Dj+1, . . . , Dj+r}, then it can do this immediately (with a procedure very similar to the first embodiment). If there is any further loss in that set, say that packet Dj+s (S≤r) is lost too, then the receiving unit 200 asks for correction information under the form of the second component of the transmitter's current state vector. Consequently the transmitting unit 100 returns the value of the state Sj+s+r',2 and the associated sequence number j+s+r'. Notice that r' may (slightly) differ from r. If there is no further loss r' packets after the second loss, then the receiving unit 200 has in principle enough information to reconstruct both missing packets. If there is, the receiving unit 200 requests the third component of the transmitter's current state vector, and so on.

At a certain moment, the receiving unit 200 has received n pieces of correction information and there are just n missing packet to reconstruct. By using the properties of the GF it can be readily seen that, in order to reconstruct the n missing packets, a matrix equation has to be solved of the form:

$$B \cdot \begin{bmatrix} D_j \\ D_{j+s_1} \\ \vdots \\ D_{j+s_1+\ldots+s_{n-1}} \end{bmatrix} = b \quad (7)$$

where s1, ..., sn−1 are the index offsets between the n missing packets, where B is an (n×n)-matrix that depends on A and a, and where b is an (n×1)-matrix (i.e., vector) that depends on A, a, the value of the non-missing packets, the state vector prior to the first packet loss and the received correction information.

The matrix A and the vector a should be well chosen such that the matrix B is invertible for as many loss patterns as possible. In particular, the vector a should have no entries equal to 0. In fact, and without loss of generality, the vector a can be chosen with all its entries equal to 1. if the matrix B has an inverse, then the n missing packets can be reconstructed and the receiving unit 200 can re-sync with the transmitting unit 100. In the (hopefully rare) case that the matrix B is not invertible, the n missing packets cannot be reconstructed and the receiving unit 200 has to (persistently) request the "current" version of the complete state vector to the transmitting unit 100, or wait until the transmitting unit 100 advertises that value. After receiving this information the receiving unit 200 is in sync again (and the loss period ends). Notice that n is bounded by M. If there are more than M losses in a loss period, the receiving unit 200 cannot correct them and again has to (persistently) request the "current" version of the complete state vector to the transmitter, or wait for the next advertisement.

The third embodiment is similar to the second. It uses the same GF. It is known that such a field, besides the neutral element for the addition and the neutral element for the multiplication, also contains at least one so-called primitive element, denoted as α. This primitive element has the property that $\alpha^t \neq 1$ for all $0<t<Q-1$, and that $\alpha^{Q-1}=1$.

As in the second embodiment, the state information is a M-dimensional vector of elements of this GF. The vector function f(Dk,Sk−1) (which is chosen not to depend on k) is defined entry by entry. The m-th entry of the state vector is defined as:

$$S_{k,m} = D_k + \alpha^{m-1} \cdot S_{k-1,m} \quad (8)$$

where m=1, ..., M and M<Q−1.

Suppose that, at some moment in time, packet Dj−1 is correctly received and that the receiving unit 200 is in sync with the transmitting unit 100 (i.e., both have the same state Sj−1). If packet Dj is lost, the receiving unit 200 requests correction information under the form of the first component of the transmitter's state vector. Upon arrival of this request, the transmitting unit 100 returns the value of the state Sj+r,1 and the associated sequence number j+r. At the moment this correction information arrives, the receiver can try to reconstruct the lost packet. If there is no further loss in the set of packets {Dj+1, ..., Dj+r}, then it can do this immediately. If there is any further loss in that set, say that packet Dj+s is lost too, then the receiver asks for correction information under the form of the first two components of the transmitter's current state vector. Consequently the transmitting unit 100 returns the value of the state [Sj+s+r',1; Sj+s+r',2] and the associated sequence number j+s+r'. Notice that, as before, r' may (slightly) differ from r. If there is no further loss r' packets after the second loss, the receiver has enough information to reconstruct both missing packets. If there is, the receiver requests the first three components of the state vector, and so on.

If, at a certain moment, the receiving unit 200 has received all of the first n components of the state vector (associated to one particular packet) correctly and there are just n missing packet to reconstruct (Dj, Dj+s₁, ..., Dj+s₁+...+s_{n−1}), the receiving unit 200 has enough information to reconstruct all missing packets (and all associated state vectors such that it can resynchronize with the transmitting unit 100). It is cumbersome, but straightforward, to prove that, in order to do so, the receiver has to solve a linear set of equations of the following form:

$$\begin{bmatrix} 1 & 1 & \cdots & 1 \\ 1 & \alpha^{s_1} & \cdots & \alpha^{s_1+\ldots+s_{n-1}} \\ \vdots & \vdots & \ddots & \vdots \\ 1 & \alpha^{s_1 \cdot (n-1)} & \cdots & \alpha^{(s_1+\ldots+s_{n-1}) \cdot (n-1)} \end{bmatrix} \cdot \begin{bmatrix} D_j \\ D_{j+s_1} \\ \vdots \\ D_{j+s_1+\ldots+s_{n-1}} \end{bmatrix} = b \quad (9)$$

where b is an (n×1)-matrix that depends on the value of correctly received packets and α, the state vector Sj−1 prior to the first packet loss and the received correction information.

The (n×n)-matrix on the left hand side is a vandermonde matrix and it is invertible (and hence the set of equations has a unique solution) if all the elements on the second row of this matrix differ. Because α is a primitive element, this is guaranteed if all $s_1+\ldots+s_{n-1}<Q-1$. Consequently at most M packets can be reconstructed in one loss period and this loss period must remain smaller than Q−1 packets.

If not all of the first m entries of the state vector (associated to one particular packet) are received correctly (or equivalently if the request for this correction information is lost), the receiving unit 200 has to re-issue the request (or update its request if meanwhile more packets were lost). If more than M packets are lost, or as soon as the loss period grows beyond Q−1, the receiving unit 200 has to persistently ask for the complete state vector of the transmitting unit 100, or wait for the next advertisement.

Compared to the second embodiment, this third embodiment generates a larger amount of correction information, but it can correct more lost packets.

A fourth embodiment is the same as the third embodiment, but the loss characteristics are such that it is a priori known that losses occur in bursts of more or less constant length. In this case the dimension M of the state vector is chosen equal to the longest expected burst size. When a packet loss is detected, the complete state vector is immediately asked for. For the rest the same procedure as in the third embodiment applies.

The transmitting unit 100 would be advantageously implemented in an access node, such as a DSLAM or a wireless/mobile base station, which is typically subject to an error-prone environment (e.g., interference and impulse noise over a DSL line). This would reduce the RTT and thus the length of the loss period, making transmission of further TSV's components less likely, and also improving the expectation of the amount of corrupted or missing information, if any.

The receiving unit 200 may form part of a subscriber gateway or terminal. The receiving unit 200 may also form part of a decoding device, in which case the reception cache 210 stands for the de-jittering buffer where the data packets are held before further decoding and play out.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A transmitting unit configured to transmit a flow of indexed data packets towards a receiving unit, the transmitting unit comprising:
    a processor configured to,
        transmit, using a transmitter, the data packets including a header having an index stored therein whose value sequentially varies with each subsequent one of the data packets,
        update a Transmission Status Vector (TSV), at the transmitting unit, whenever one of the data packets is scheduled for transmission, the TSV being a single state vector having a number of vector components and compiling transmission history for the flow of data packets, the updating including updating each of the vector components of the TSV based on the data packet that has been scheduled for transmission, the TSV matching a corresponding Reception Status Vector (RSV) similarly updated at said receiving unit whenever the receiving unit receives one of the data packets having an index value which is an expected index value, and
        transmit, using a transmitter, a current value of at least one vector component of said TSV if the receiving unit indicates that a data packet corresponding to the expected index value has not been received thereat or is corrupted, the TSV being such that when the transmitted current value of the TSV is combined, at the receiver, with the RSV and the data packets received at the receiver having index values greater than the expected index value, the data packet corresponding to the expected index value is recoverable.

2. The transmitting unit according to claim 1, wherein said processor is further configured to periodically advertise towards said receiving unit a current vector value of said TSV.

3. The transmitting unit according to claim 1, wherein said processor is further configured to select at least one vector component under control of said receiving unit.

4. The transmitting unit according to claim 1, wherein said processor is further configured to communicate with said receiving unit by means of a stateless data communication protocol.

5. An encoding unit accommodating the transmitting unit according to claim 1.

6. A multicast replication node accommodating the transmitting unit according to claim 1.

7. An access node accommodating the transmitting unit according to claim 1.

8. The transmitting unit of claim 1, wherein the transmitting unit is configured to update the TSV such that a length of each of the vector components of the TSV matches a length of the data packets.

9. A method for protecting a flow of indexed data packets transmitted towards a receiving unit against data lost or data corruption, wherein said method comprises:
    transmitting, using a transmitter, the data packets including a header having an index stored therein whose value sequentially varies with each subsequent one of the data packets;
    updating a Transmission Status Vector (TSV) whenever one of the data packets is scheduled for transmission, the TSV being a single state vector having a number of vector components and compiling transmission history for the flow of data packets, the updating including updating each of the vector components of the TSV based on the data packet that has been scheduled for transmission, the TSV matching a corresponding Reception Status Vector (RSV) similarly updated at said receiving unit whenever the receiving unit receives one of the data packets having an index value which is an expected index value; and
    upon request from said receiving unit, transmitting a current value of at least one vector component of said TSV if the receiving unit indicates that a data packet corresponding to the expected index value has not been received thereat or is corrupted, the TSV being such that when the transmitted current value of the TSV is combined, at the receiver, with the RSV and the data packets received at the receiver having index values greater than the expected index value, the data packet corresponding to the expected index value is recoverable.

10. A receiving unit configured to receive a flow of indexed data packets from a transmitting unit, the receiving unit comprising:
    processor configured to,
        receive, using a receiver, the data packets including a header having an index stored therein whose value sequentially varies with each subsequent one of the data packets,
        update a Reception Status Vector (RSV) whenever the receiver receives one of the data packets having an index value which is an expected index value, the RSV being a single state vector having a number of vector components and compiling reception history for the flow of data packets, the updating including updating each of the vector components of the RSV based on the received data packet having the expected index value, the RSV matching a corresponding Transmission Status Vector (TSV) similarly updated at said transmitting unit whenever the transmitting unit schedules one of the data packets for transmission, transmit, to the transmitting unit, an indication that a data packet corresponding to the expected index value has not been received by the receiver or is corrupted, if the data packet corresponding to the expected index value has not been received or is corrupted;

receive, using a receiver, from said transmitting unit a current value of said TSV, recover the data packet corresponding to the expected index value from the current value of the TSV, the RSV and the data packets received at the receiver having index values greater than the expected index value.

11. The receiving unit according to claim 10, wherein said receiving unit further comprises:
a selector configured to select said at least one vector component within said TSV.

12. The receiving unit according to claim 11, wherein at least one vector component is selected in dependance of a current amount of information, the recovery of which is pending.

13. The receiving unit according to claim 11, wherein at least one vector component is selected in dependance of an estimated amount of information, the recovery of which is expected to be pending upon receipt of said at least one current component value.

14. The receiving unit according to claim 10, wherein said processor is further configured to communicate with said transmitting unit by means of a stateless data communication protocol.

15. A subscriber gateway accommodating the receiving unit according to claim 10.

16. A subscriber terminal accommodating the receiving unit according to claim 10.

17. A decoding device accommodating the receiving unit according to claim 10.

18. A method for recovering a missing or corrupted data packet ($D_j$) within a flow of indexed data packets received from a transmitting unit, wherein said method comprises:

receiving, at a receiver, the data packets including a header having an index stored therein whose value sequentially varies with each subsequent one of the data packets;

updating a Reception Status Vector (RSV) whenever the receiver receives one of the data packet having an index value which is an expected index value, the RSV being a single state vector having a number of vector components and compiling reception history for the flow of data packets, the updating including updating each of the vector components of the RSV based on the received data packet having the expected index value, the RSV matching a corresponding Transmission Status Vector (TSV) similarly updated at said transmitting unit whenever the transmitting unit schedules one of the data packets for transmission;

transmit, to the transmitting unit, an indication that a data packet corresponding to the expected index value has not been received by the receiver or is corrupted, if the data packet corresponding to the expected index value has not been received or is corrupted;

receiving, at the receiver, from said transmitting unit a current value of said TSV; and recovering the data packet corresponding to the expected index value from the current value of the TSV, the RSV and the data packets received at the receiver having index values greater than the expected index value.

* * * * *